Dec. 4, 1928.
P. BÖTTCHER
1,694,115
DOVETAILING, COGGING, AND INDENTING MACHINE
Filed Jan. 21, 1927
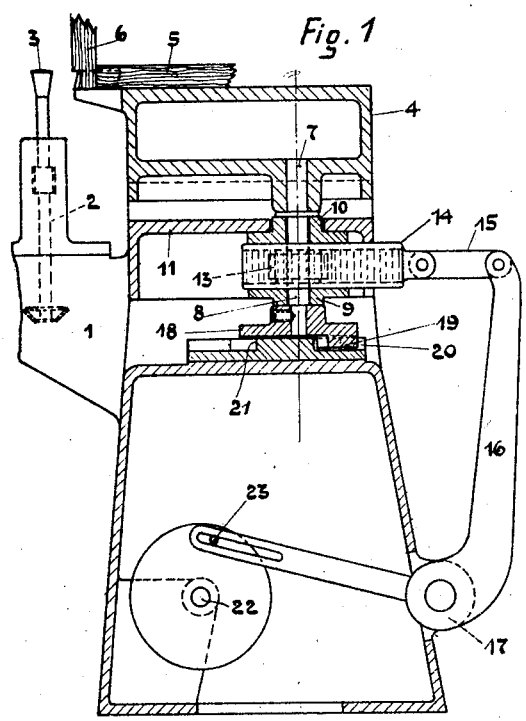
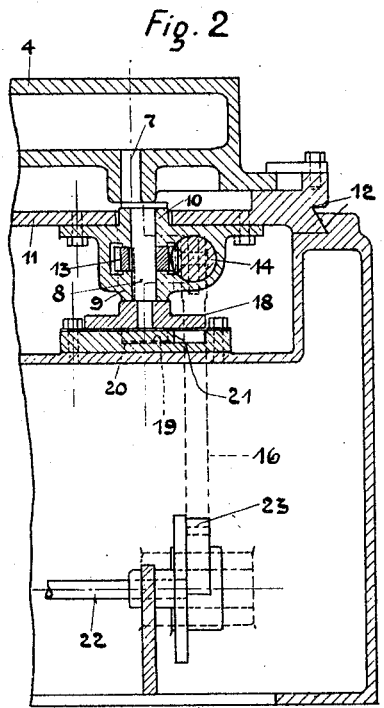
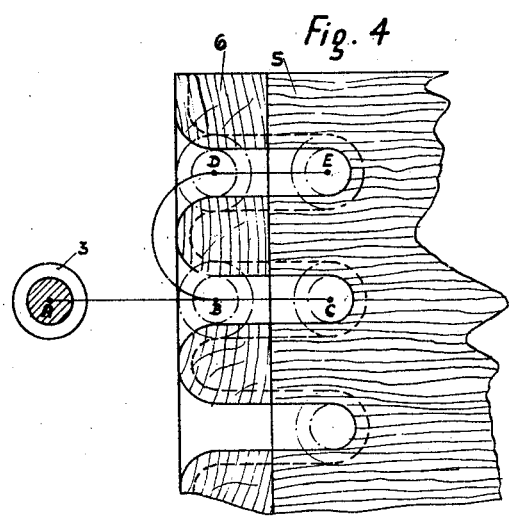
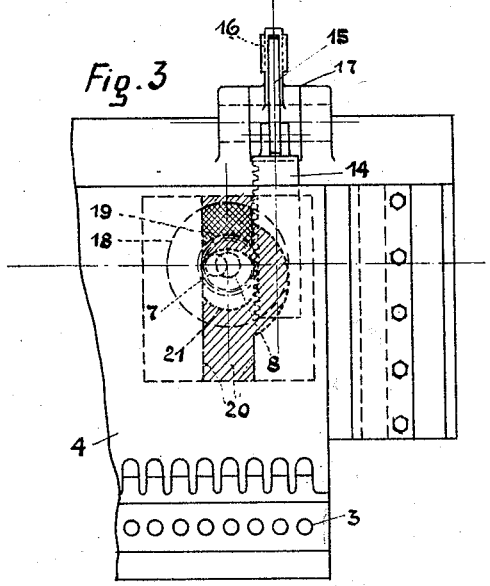
Inventor:
P. Böttcher
By: Maules & Clark
Attys.

Patented Dec. 4, 1928.

1,694,115

UNITED STATES PATENT OFFICE.

PAUL BÖTTCHER, OF ATONA-BAHRENFELD, NEAR HAMBURG, GERMANY.

DOVETAILING, COGGING, AND INDENTING MACHINE.

Application filed January 21, 1927, Serial No. 162,655, and in Germany January 23, 1926.

This invention refers to dovetailing, cogging and indenting machines, and it is particularly concerned with machines of this kind as applied to the treatment of wood and similar material, and it is one of the main important objects of the invention to facilitate and render more uniform the cutting of the so-called rounded dovetails or cog-like inter-engaging indentations by means of which the parts are clinchingly united to each other, and it is another object of the invention to generally improve and increase the efficiency and the general construction of machines of the kind referred to, and to attain other important advantages that will appear as the specification proceeds. The machines generally employed for the production of such indentations, cogging or dovetailing in accordance with the previous art were mostly provided with a large number of milling or moulding spindles disposed in the vertical plane and vertically spaced to correspond to the distance of the desired dovetails or indentations from each other, each of the said milling or molding spindles carrying at its upper freely movable extremity a mill-cutter in accordance with the shape of the particular dovetailed grooves to be cut. The other essential component of the previous machines of this kind is a receiving or delivery table upon which the pieces of timber or wooden articles to be provided with indentations or dovetails were securely clamped or otherwise retained in position, and which in accordance with the progress of the operation is moved relatively to the plurality of mill cutters in such a manner as to result in the cutting of the desired series of indentations. Now, in view thereof this invention is particularly distinguished from this previous state of the art by novel means of effecting the feeding of the table, combined with novel means for the production of the table movement, and within the scope of this invention, instead of imparting the desired kinds of movement to the table the series of mill cutters may constitute the movable member, while the table may be stationarily arranged.

The invention will be more fully described with reference to the accompanying drawing showing by way of exemplification one of the possible embodiments of the principles of this invention in Figure 1 in vertical section with relation to the working plane. Figure 2 is a vertical section of the machine in parallel direction with relation to the cutting or milling plane, the left-hand side of the machine being broken off, this part being otherwise constructed similar to the right-hand side of the machine. Figure 3 is a top plan view of the part of the machine shown in section in Figures 1 and 2, while in Figure 4 the two parts of timber or wooden articles to be jointed are shown in the finished condition and seen from below and clamped in position by any suitable means.

As appears from Figure 1 of the drawing a plurality of milling spindles 2 are vertically disposed on the frame of the machine in the usual manner the upper movable ends of which carry finger-like mill cutters 3 corresponding to the shape of the substantially dovetail-shaped projection of the indentations to be produced. This part of the machine does not present any novelty as compared with the usual form of construction. Movably disposed on the frame of the machine is the delivery or receiving table 4 upon which the two wooden parts 5 and 6 are retained by suitable clamping means in position to be united to a common corner, the clamping and securing means being not shown in the drawing. In accordance with the usual practice the front section 6 of the two pieces of wood is secured in the vertical position, while the other wooden section 5 is secured at the rear thereof, so as to abut there-against with an obtuse angle. In the milling operation as heretofore practiced it was usual to first feed the table by means of a horizontal sliding carriage at right angle to the working plane towards the milling tools and to advance the table to a sufficient extent to allow of the milling cutters to remove the full depth of the grooves or dovetails to be cut from the two pieces of timber or wooden articles. The two pieces of wood shown in bottom view in Figure 4 of the drawing show the path of the tools in thin lines and therefore clearly indicate the entire manner of operation. To the first period of operation as hereinbefore described corresponds in Figure 4 the feeding of the mill cutter from A by way of B towards C. With the mill cutters positioned with their axis at C the rear end of the dovetailed grooves has been finished. This end will of course conform to the rounding off by the action of the cutting tool and it therefore presents a semi-circular curve. In order to provide for the exact fitting of the wooden part 6 with the wooden part 5, when the parts are locked in engagement at the corner, it becomes necessary to likewise semi-circularly round off the front edges of the wooden part 6. For this purpose a second working stage becomes necessary which comprises the withdrawing of the mill cutter from the point C towards B and the directly succeeding guiding of the mill cutter along the semi-circle from B towards D. During this guiding movement in the semi-circular direction the front end of each cog or indentation is semi-circularly rounded off, the shape thus produced upon the subsequent turning of this section 6 and the jointing of the two sections into a corner fitting exactly into the semi-circular extremity of the groove in the wooden portion 5. It is, of course, immaterial for the mode of operation, whether the mill cutter is moved with relation to the stationary piece of wood 4 along the path indicated in the drawing, or whether on the other hand, the mill cutter is relatively stationary, while the table with the pieces of work secured thereto is caused to perform all the movements required. Merely the relative movement between the two cooperating parts is of importance. For the sake of clearness of illustration and understanding it has been assumed in Figure 4 that the tool is being moved, while in the form of machine, as usually employed and as shown in the other figures the milling tools are relatively stationary, while the table is made to perform all the required movements.

With all machines of this kind it becomes necessary therefore to impart to the table with the pieces of work secured thereto a temporary rectilinear movement in the vertical direction with relation to the working plane, and temporarily to impart thereto a semi-circular rocking movement. The means heretofore employed for the carrying out of these two kinds of movement generally comprise a cross-supporting carrier. During the rectilinear movement at right angle to the working plane the carriage of the supporting carrier is displaced, while during the semi-circular rocking movement the table is guided by means of a guide pin in the stationary former or the like, the semi-circular movement of the entire table resulting therefrom being brought about by resolving the circular movement into its components or into the partial movements of the supporting carrier at right angle to each other and taking place in the carriage guides. The manner of producing a semi-circularly rocking movement of the table by means of a guiding former is accompanied with imperfections and inaccuracies in many respects, and the result depends largely upon the dexterity and the skill of the workman carrying out these operations. Other constructions of machines of the kind referred to have been disclosed in which this semi-circular movement of the table is effected by a half turn of a crank shaft suitably connected with the table and without the assistance of formers or templates. Inasmuch as before and after this circular movement a rectilinear movement should take place, the transition from the circular movement produced by the crank to the particular rectilinear movement of the carriage presents great difficulties. Such constructions of machinery are therefore very complicated and they are not absolutely reliable in their mode of operation.

Now in accordance with this invention, the construction is such that it becomes possible to dispense with the disengagement of the table from the stud of the crank shaft. This object is accomplished in this invention by mounting the crank shaft on a special carriage, so as to be movable at right angle with relation to the working plane, instead of stationarily mounting it on the machine frame.

In view thereof the table 4 in the embodiment according to Figure 1 is disposed on the crank pin 7 of the crank shaft 8. This crank shaft 8 is journalled in the bearings 9 and 10 of a crank shaft-carriage 11 which is displaceably mounted in a horizontal carriage guide 12 at right angle to the working shaft. In order to secure the table against rotation during the carrying out of the rocking movement, the table might be guided in the usual manner by special cross-supporting guides not shown in the drawing. In the exemplification herewith presented this securing from rotation is obtained by other means comprising the arrangement of two parallel crank shafts upon the common crank shaft-carriage 11. With this end in view the carriage 11 extends over the entire width of the machine frame and carries a crank shaft 8 on its two sides, as appears from Figure 2 of the drawing. The table 4 therefore constitutes, so to speak, a connecting or linking rod between the two parallel cranks and it therefore performs a rocking movement along a circle of a radius corresponding to the eccentricity of the crank pin 7 with simultaneous positively effected rotation of the two crank shafts.

By means of the arrangement described it becomes possible by the displacement of the crank shaft-carriage 11 in its straight guide 12 to cut out the rectilinear portion of the groove of the indentation of dovetail to the desired depth and by the rotating movement of the two crank shafts 8 through 180 degrees and the thereby resulting corresponding circular rocking movement of the table 4 to produce the rounding off of the front edges. Instead of the rather complicated cross-slide movement previously employed with the assistance of formers the invention makes use of two simple movements of one and the same part of machinery, that is to say, of the crank shaft which remains permanently connected to the table. In accordance with the crank shaft 8 being rectilinearly displaced together with the crank shaft-carriage 11 or being turned upon the carriage, the table will perform the rectilinear or respectively the circular portion of the necessary movement of the table. Both these simple kinds of movement may be induced in any suitable manner and without complication and may be carried out by any unskilled laborer.

In further pursuance of my invention means are provided to produce the two kinds of movement of the crank shafts heretofore referred to by starting with one simple fundamental movement. As a means of producing in succession a rotary and a rectilinear movement of the crank shaft mounted upon a sliding carriage a rack bar is employed in the exemplification herein shown, this rack bar meshing with a gear wheel upon the crank shaft. A rectilinearly guided rack bar produces a corresponding rotary movement of a gear wheel keyed to the crank shaft, as long as this rotary movement is possible. Furthermore, the identical movement of the rack bar pushes the entire crank shaft-carriage together with the crank shaft rectilinearly forward, as long as the rotating movement is prevented and the carriage is released for straight movement. Similar actions, that is to say the production of rectilinear or respectively rotating movements from a common driving member may be produced by means of similar elements of machinery, such as for instance drums, wound-off steel bands or the like or by means of worms adapted to engage with worm wheels secured to the crank shafts.

In the exemplification shown the crank shaft 8 is provided between the bearings 9 and 10 with a pinion 13 adapted to engage with a round rack bar 14 and displaceable in the parallel direction in the crank shaft-carriage 11 with relation to the carriage guide 12. The rack bar 14 is connected by a small link rod 15 to an elbow lever 16 which with its eye 17 is rockingly disposed in the frame of the machine. By the movement of the lever 16 the rack bar 14 is moved in a direction parallel to the carriage guide or vertically with relation to the working plane. This movement may either be effected by causing the rack bar 14 to be displaced in its round guide in the temporarily arrested crank shaft-carriage 11, so as to produce the rotation of the gear wheel 13 with the crank shaft 8, or the entire crank shaft-carriage 11 may be displaced as a whole with the rack bar in the machine frame along its carriage guide 12 at right angle to the working plane, while the crank shaft 8 is arrested against rotation. The same movement of the lever 16 may therefore be employed to produce either the rectilinear movement of the crank shaft-carriage 11 in the guide 12 or the rotary movement of the crank shaft 8 depending upon which of the two movements is arrested, while the other movement is released. The special arrangement serving for this alternate locking and release will be more particularly described hereinafter.

It has already been pointed out that, as hereinbefore described, the operation according to the diagram of Figure 4 is to ensue in the order A B C D and inversely and then back from D—B back to the initial position A. This combination of the different parts of the entire working path resulted in the first place in the rectilinear movement from A—C followed by a reversal of the rectilinear movement from C—B, and the then occurring stopping of the rectilinear movement and the starting of the rotary movement of the crank shaft from B—D followed by a reversal of this rotary movement from D—B, the stopping of this rotary movement and the taking up again of the rectilinear movement from B back to A. If it would be intended to derive these different partial movements in their proper sequence from a single simple forward feeding movement, complicated coupling means or other reversing members with corresponding mechanism for the operation thereof would have to be provied. In order to overcome this difficulty the novel combination of parts of the different sections of the working path hereinafter described is employed in accordance with this invention, in which each point of the working path will be passed through only once in the reciprocation of the operating parts, and in pursuance thereof it becomes possible to produce an automatic control depending upon the particular point of operation and by simple means. In the first place the rectilinear movement of the carriage from A—B takes place whereupon at the point B after the stopping of the rectilinear movement the rotary movement is carried out as far as the point D and is then stopped at D, whereupon the rectilinear movement of the carriage is continued as far as E. The rectilinear movement of the carriage is therefore interrupted once only in the middle of the path for the purpose of starting the rotary movement, which means a considerably simplified possibility of operation. The milling tools will therefore cut the gaps at B only just to the depth of the rounding off centre and will then only perform the rounding off movement, and only after the completion thereof they are projected to the full depth of the indentation to be produced, that is to say as far as E and only in the next adjoining groove. The reverse movement is then effected in exactly inversed order.

In order to attain an automatic control of the movement of the crank shaft in conformity with the particular working position the crank shaft 8 is provided at its lower free end with a flange 18 carrying a sliding piece 19 eccentrically disposed with relation to the centre of the shaft. This slide 19, as seen from above, possesses a shape shown in Figure 3 in the cross-shaded part. It appears therefrom that it represents a part of a circular ring which is bounded at one side by two concentric circles described on the axis of the crank shaft 8, and on the other hand by two parallel lateral surfaces upon which the width of the slide depends. This slide 19 is adapted to move in a guiding groove 20 which is secured to the frame of the machine in a corresponding position. This guide 20 comprises substantially a straight groove the width of which corresponds exactly to the breadth of the slide 19. Upon moving the crank shaft 8 with the carriage 11 in the rectilinear carriage guide 12 the slide 19 will therefore be caused to move in the guiding groove 20. This guiding groove 20 is interrupted at its central portion by a circular part 21 the diameter of which corresponds exactly to the interior curve of the sliding piece 19. This circular interruption will therefore cause the stopping of the rectilinear carriage movement upon the engagement with the sliding piece 19. By the annular connection between the front and rear parts of the guiding groove 20 it becomes possible however for the sliding piece 19 at the time of the stopping of its rectilinear movement in pursuance of the engagement with the circular portion 21 to effect a rotary movement in the ring-shaped part of the guiding groove around the axis of the crank shaft 8. After the execution of this rotary movement through 180 degrees the sliding piece 19 will again strike with its shaft against the corresponding side edges of the rectilinear guiding groove. In consequence thereof the further rotary movement becomes impossible or is arrested for the moment, while simultaneously the further sliding of the sliding piece 19 along the other end of the rectilinear guiding groove has become possible. In view of the fact that during the whole time by the movement of the lever 16 a pressure is exerted upon the rack bar and consequently upon the gear wheel 13 and the crank shaft 8, the table 4 by the action of the sliding piece 19 in the guide groove 20 will be caused to perform alternatingly a rectilinear stepwise movement in the guide 12 or a circular movement on the crank pin 7 around the center of the crank shaft, in accordance with the stopping of one of the movements and the respective release of the other movement at each particular unit of time.

If, therefore, the lever 16 is operated in the same direction continuously by manual operation, this will produce automatically the successively occurring exchange of stages of operation, the straight movement of the carriage from A to B being followed by the rounding off movement from B to D, and immediately succeeding thereto the straight movement of the carriage from D to E. The desired mode of operation with the alternatingly occurring rectilinear and rotary movements is therefore accomplished by the simple movement of the lever 16 and without any change or reversal of operation. By the inverse movement of the lever 16 the entire working path of the milling cutter is repeated in the reverse order, that is to say, the cutting tool will now follow the path from E—D—B— back to A with relation to the piece of work. The whole manipulation therefore consists in reciprocating the lever once.

Inasmuch as by this method of operation the required different movements have been condensed into a single reciprocating movement of a lever or of a rack bar, there will be no difficulty whatever in replacing the manual operation by perfectly automatic operating means. For this purpose, it is only necessary to provide any suitable means which, when thrown into operation, will produce a simple reciprocating movement, and is adapted to become automatically disengaged after having performed this movement once. The details of such a kind of automatic driving and operating means may be of different construction. They are mostly known and do not form an essential feature of the present invention. In the drawings the carrying out of this automatic movement is indicated as being effected by a crank shaft 22 with crank pin 23, the said crank pin 23 imparting to the elbow lever 16 a reciprocating rocking movement in the manner desired upon a full rotation of the crank shaft 22 in a manner similar to the usual pin-and-slot connection.

While the invention has been described herein in certain particular embodiments, it should be understood that modifications may be made, and that no limitations upon the invention are intended other than those imposed by the scope of the appended claims.

I claim:—

1. In a dovetailing machine and the like in combination, cutting means and work supporting means relatively movable with relation to each other, an alternately and successively rectilinearly and oscillatingly movable supporting carriage for one of the moving means and means coacting with the carriage for positively guiding the same in two spaced parallel paths and in a transverse curved connecting path intermediate the parallel paths.

2. In a dovetailing machine and the like in combination, cutting and dovetailing means and work supporting means, relatively movable with relation to each other in a substantially zigzag or meander-like path, and a supporting carriage for one of the relatively movable means, and combined actuating and guiding means adapted to positively and alternatingly move said carriage in two spaced parallel paths and in a transverse curved connecting path intermediate the parallel paths.

3. In a dovetailing machine and the like in combination, cutting and dovetailing means and work carrying means, relatively movably disposed, a supporting carriage for one of the movable means, and a crank operated connection between such part and the supporting carriage, means coacting with the crank operated connection to move the carriage in a straight path and means coacting with the crank operated connection to impart a rocking movement to said carriage alternately with respect to the straight movement.

4. In a dovetailing machine and the like in combination, work-treating and dovetailing means and work carrying means, movably disposed with relation to each other, a supporting carriage for one of said movable means, a crank connection between said last mentioned movable means and the supporting carriage, two positively connected crank shafts on both sides of the carriage and in operative engagement with the crank connection, and means to alternately impart rectilinear and lateral rocking movement to the crank shafts and to the carriage.

5. In a dovetailing machine and the like in combination, work-treating and dovetailing means and work carrying means, parallel, positively connected crank shafts, a crank pin on said connected crank shafts and operatively connected to one of the relatively movable means, and an intermediate link member between the crank pin and the relatively movable means, and combined actuating and guiding means to alternatingly and successively move the link-connected relatively movable means in a straight path and respectively in a curved path.

6. In a dovetailing machine and the like in combination, work-treating and dovetailing means and work carrying means, movably disposed with relation to each other, a crank shaft, link connection between said crank shaft and one of the relatively movable means, an operating member, gear-connection between said member and the crank shaft, straight guiding means for the crank-shaft operated relatively movable means, and interrupting means in the path of the guiding means, adapted to impart alternatingly rectilinear and rotary movement to the crank-operated movable means.

7. In a dovetailing machine and the like, in combination, work-treating and dovetailing means and work-carrying means, movably disposed with relation to each other, a crank shaft, link connection between one of said relatively movable means and the crank shaft, an operating reciprocable member, gears operatively connected to the crank shaft, a rack bar operatively connected to the operating member, and straight guiding means for said rack bar, and straight guiding means for the link-connected relatively movable work-engaging means, and interrupting means adapted to alternatingly impart rectilinear and rotary movement to the link-connected work engaging means.

8. In a dovetailing machine and the like, work engaging, treating and dovetailing means and work engaging carrying means, movably disposed with relation to each other, a supporting carriage for one of the relatively movable work engaging means, a crank shaft, and a crank pin on said shaft on which the said carriage is mounted, a straight guide for the carriage, substantially at right angle to the other work engaging means, a reciprocable rack bar operatively engageable with the crank shaft, and an operating member for said rack bar, and means adapted to lock the crank shaft against rotation during the movement of said operating member.

9. In a dovetailing machine and the like, work engaging treating and dovetailing means and work carrying means, movably disposed with relation to each other, a supporting carriage for one of the relatively movable work engaging means, a crank shaft, and a crank pin on said shaft on which the said carriage is mounted, a straight guide for the carriage, adapted to guide the carriage with the one work engaging means in the direction towards the other work engaging means, a reciprocable rack bar, and gear connection between the crank shaft and the rack bar, an operating lever, linked to the rack bar, and a crank drive for the operating lever, adapted to impart reciprocatory movement thereto.

10. In a dovetailing machine and the like, work engaging, treating and dovetailing means and work engaging, carrying means, movably disposed with relation to each other, a supporting carriage for one of the relatively movable work-engaging means, a crank shaft and a crank pin on said shaft on which the said carriage is mounted, a straight guide for the carriage, adapted to guide the carriage with the one work-engaging means towards and with relation to the other work-engaging means, an eccentrically disposed member on said crank shaft, straight guiding means for said member and an intermediate curved portion on said guiding means, engageable with the eccentric member, means to move the member and its guiding means relatively to each other.

11. In a dovetailing machine and the like, work engaging, treating and dovetailing means and other work engaging, carrying means, movably disposed with relation to each other, a supporting carriage for one of the relatively movable work-engaging means, a crank shaft and a crank pin on said shaft, on which the carriage is mounted, a straight guide for the carriage, a cross-sectionally round rack bar, displaceably disposed on the carriage in parallel relation to the guide thereof, gear connection between the rack bar and the crank shaft, operating means for the rack bar, and temporarily operated motion-interrupting and changing means for the gear connection.

12. In a dovetailing machine as claimed in claim 3, stops for positively effecting the alternate movement irrespective of the position of the other movable means.

13. A dovetailing machine as claimed in claim 5, wherein the combined actuating and guiding means is arranged so that the work carrying means is given a circular rocking movement during the rounding off of the front edges of the grooves that are being formed for the purpose of preventing a twist during the circular rocking movement on the crank pins of the two positively connected crank shafts.

14. In a dovetailing machine and the like in combination, work treating and dovetailing means, work carrying means, a crank shaft carriage for supporting one of the said means, means for moving the crank shaft carriage and the means supported thereon rectilinearly to the plane of the other first mentioned means during the cutting of the straight dovetailed grooves, and means for effecting a rotary movement of these movable parts during rounding of the edges of the grooves.

15. A machine as claimed in claim 2, wherein the combined operating and guiding means includes a single member for effecting the rotary and rectilinear movement of the supporting carriage in such a manner that when one movement stops the said driving member produces the other movement.

16. A dovetailing machine as claimed in claim 1, wherein each point of the working path of the movable supporting means is passed through only once on the reciprocating path.

In testimony whereof I affix my signature.

PAUL BÖTTCHER.